United States Patent

Jennings, III

[19]

[11] Patent Number: 6,134,631
[45] Date of Patent: *Oct. 17, 2000

[54] NON-VOLATILE MEMORY WITH EMBEDDED PROGRAMMABLE CONTROLLER

[75] Inventor: Earle W. Jennings, III, San Jose, Calif.

[73] Assignee: Hyundai Electronics America, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/739,394

[22] Filed: Oct. 31, 1996

Related U.S. Application Data

[60] Provisional application No. 60/024,355, Aug. 19, 1996.

[51] Int. Cl.[7] .............................. G06F 12/00; H04L 9/00
[52] U.S. Cl. .......................... 711/117; 711/101; 711/111; 711/112; 711/113; 711/118; 711/119; 711/122; 711/123; 711/154; 711/170; 348/266; 348/272; 348/273; 348/282; 348/294; 348/311; 455/403; 455/422; 380/277; 380/278; 380/287
[58] Field of Search .............................. 380/4, 9, 49, 50, 380/59; 395/200.6, 200.67, 651, 652, 653, 712; 455/403, 418, 422, 466; 348/207, 216, 231, 234, 266, 272, 273, 282, 294, 311, 265, 274; 711/101, 111–113, 117–119, 122, 123, 133, 136, 141, 143, 150, 154, 158, 170, 173

[56] References Cited

U.S. PATENT DOCUMENTS

| | | |
|---|---|---|
| T948,012 | 7/1976 | Boucknecht et al. . |
| 4,106,056 | 8/1978 | Nagumo et al. .......................... 348/265 |
| 4,530,055 | 7/1985 | Hamstra et al. ......................... 711/136 |
| 4,574,163 | 3/1986 | Zato ....................................... 380/50 X |
| 4,719,568 | 1/1988 | Carrubba et al. ....................... 711/123 |
| 5,729,683 | 3/1998 | Le et al. ............................. 395/200.67 |

*Primary Examiner*—Bernarr E. Gregory
*Attorney, Agent, or Firm*—Townsend & Townsend & Crew LLP

[57] ABSTRACT

Computer systems may be provided with additional performance for demanding applications while adding little additional hardware. For example, a slave device for a host computer system combines an embedded programmable controller with non-volatile memory, local RAM, and interface logic. The host computer system treats the slave device as if it would be a hierarchical memory system such as a conventional disk drive on which it may store and retrieve files. Additionally, the host computer system may program the controller to perform operations on stored information, including image processing and/or data compression. The non-volatile memory may include a disk drive, writable CD-ROM, optical drive, or non-volatile solid state memory.

49 Claims, 9 Drawing Sheets

| 31 30 29 28 | 27 26 25 24 | 23 22 21 20 | 19 18 17 16 | 15 14 13 12 | 11 10 9 8 | 7 6 5 4 | 3 2 1 0 | |
|---|---|---|---|---|---|---|---|---|
| COND | 0 0 1 | OPCODE S | Rn | Rd | OPERAND 2 | | | Data Processing / PSR Transfer — 812 |
| COND | 0 0 0 0 | 0 0 A S | Rd | Rn | Rs | 1 0 0 1 | Rm | Multiply — 814 |
| COND | 0 0 0 0 | 1 U A S | RdHi | RdLo | Rn | 1 0 0 1 | Rm | Multiply Long — 816 |
| COND | 0 0 0 1 | 0 B 0 0 | Rn | Rd | 0 0 0 0 | 1 0 0 1 | Rm | Single Data Swap — 818 |
| COND | 0 0 0 1 | 0 0 1 0 | 1 1 1 1 | 1 1 1 1 | 1 1 1 1 | 0 0 0 1 | Rn | Branch and Exchange — 820 |
| COND | 0 0 0 | P U 0 W L | Rn | Rd | 0 0 0 0 | 1 S H 1 | Rm | Halfword Data Transfer: register offset — 822 |
| COND | 0 0 0 | P U 1 W L | Rn | Rd | OFFSET | 1 S H 1 | OFFSET | Halfword Data Transfer: immediate offset — 824 |
| COND | 0 1 | P U B W L | Rn | Rd | OFFSET | | | Single Data Transfer — 826 |
| COND | 0 1 1 | | | | | 1 | | Undefined — 828 |
| COND | 1 0 0 | P U S W L | Rn | REGISTER LIST | | | | Block Data Transfer — 830 |
| COND | 1 0 1 | L | OFFSET | | | | | Branch — 832 |
| COND | 1 1 0 | P U N W L | Rn | CRd | CP# | OFFSET | | Coprocessor Data Transfer — 834 |
| COND | 1 1 1 0 | CP Opc | CRn | CRd | CP# | CP | 0 | CRm | Coprocessor Data Operation — 836 |
| COND | 1 1 1 0 | CP Opc L | CRn | Rd | CP# | CP | 1 | CRm | Coprocessor Register Transfer — 838 |
| COND | 1 1 1 1 | | IGNORED BY PROCESSOR | | | | | Software Interrupt — 840 |

FIG. 8.

NON-VOLATILE MEMORY WITH EMBEDDED PROGRAMMABLE CONTROLLER

STATEMENT OF RELATED APPLICATIONS

This application claims priority from U.S. Provisional Application No. 60/024,355, filed Aug. 19, 1996, the disclosure of which is herein incorporated by reference.

BACKGROUND OF THE INVENTION

The present invention relates to non-volatile memory systems and more particularly to a system that integrates hierarchically organized non-volatile memory with a programmable controller for performing operations on the non-volatile memory.

New multimedia applications for computers make great demands on system performance both in terms of processing power and memory capacity. For example, 1-D and 2-D Discrete Cosine Transforms and Inverse Discrete Cosine Transforms are necessary to implement JPEG and MPEG compression and decompression. Wavelet compression requires various digital filtering operations. Fractal compression potentially requires both filtering and extensive search operations. Image enhancement also requires digital filtering. All of these operations require extensive computations and/or comparisons to be performed on large amounts of data.

One solution is to simply assign these tasks to the CPU of a computer system. Multimedia performance will then be limited by the CPU speed as well as the speed of access to memory. If the computer system is running other tasks concurrently, these other tasks will also be performed slowly.

Another solution is to provide supplemental hardware. For example, a computer system may be equipped with an additional board including a digital signal processing circuit and memory, both dedicated to multimedia tasks. This approach, however, adds considerable expense and furthermore, the added memory duplicates resources already available within the computer system.

Similar problems are posed by system security. Controlling access to the computer and/or protecting the confidentially of data stored and/or transmitted by the computer requires that encryption and decryption be implemented. Encryption and decryption represent yet another potential drain on the computer's processing power. Furthermore, encryption and decryption key information are typically stored on the hard drive of the computer where they are difficult to protect.

SUMMARY OF THE INVENTION

The present invention provides computer systems with additional performance for demanding applications while adding little additional hardware. In one embodiment, a slave device for a host computer system combines an embedded programmable controller with non-volatile memory, local RAM, and interface logic. The host computer system treats the slave device as if it would be a hierarchical memory system such as a conventional disk drive on which it may store and retrieve files. Additionally, the host computer system may program the controller to perform operations on stored information, including image processing and/or data compression. The non-volatile memory may include a disk drive, optical disk, writable CD-ROM, and/or non-volatile solid state memory.

In accordance with a first aspect of the invention, apparatus for providing non-volatile data storage and additional processing to a host computer system includes a non-volatile memory system including at least one non-volatile memory device. The non-volatile memory system includes a hierarchical memory structure and responds to hierarchical memory structure control commands received from the host computer system by storing and retrieving information from the host computer system. The apparatus further includes a programmable controller. The programmable controller operates according to a control program received from the host computer system. The programmable controller responds to one or more commands command from host computer system to invoke the control program. The commands cause the programmable controller to operate on information stored in the non-volatile memory system.

In accordance with a second aspect of the invention, apparatus for non-volatile data storage and high-speed data processing in a host computer system includes a plurality of units. Each such unit includes a non-volatile memory system that includes at least one non-volatile memory device. The non-volatile memory system implements a hierarchical memory structure and responds to hierarchical memory structure control commands by storing and retrieving information. Each such unit further includes a programmable controller. The programmable controller operates an externally configurable control program and responding to a command from the lost computer system to invoke the control program. The control program operates on the information stored in the non-volatile memory system. Each such unit further includes an interface system for exchanging information with others of the plurality of units. The plurality of units is programmable by the host computer system to operate concurrently on stored information.

A further understanding of the nature and advantages of the inventions herein may be realized by reference to the remaining portions of the specification and the attached drawings.

BRIEF DESCRIPTION OF THE DRAWINGS

FIG. 8 shows an example of ARM instruction set formats.

DESCRIPTION OF SPECIFIC EMBODIMENTS

Figure 1:
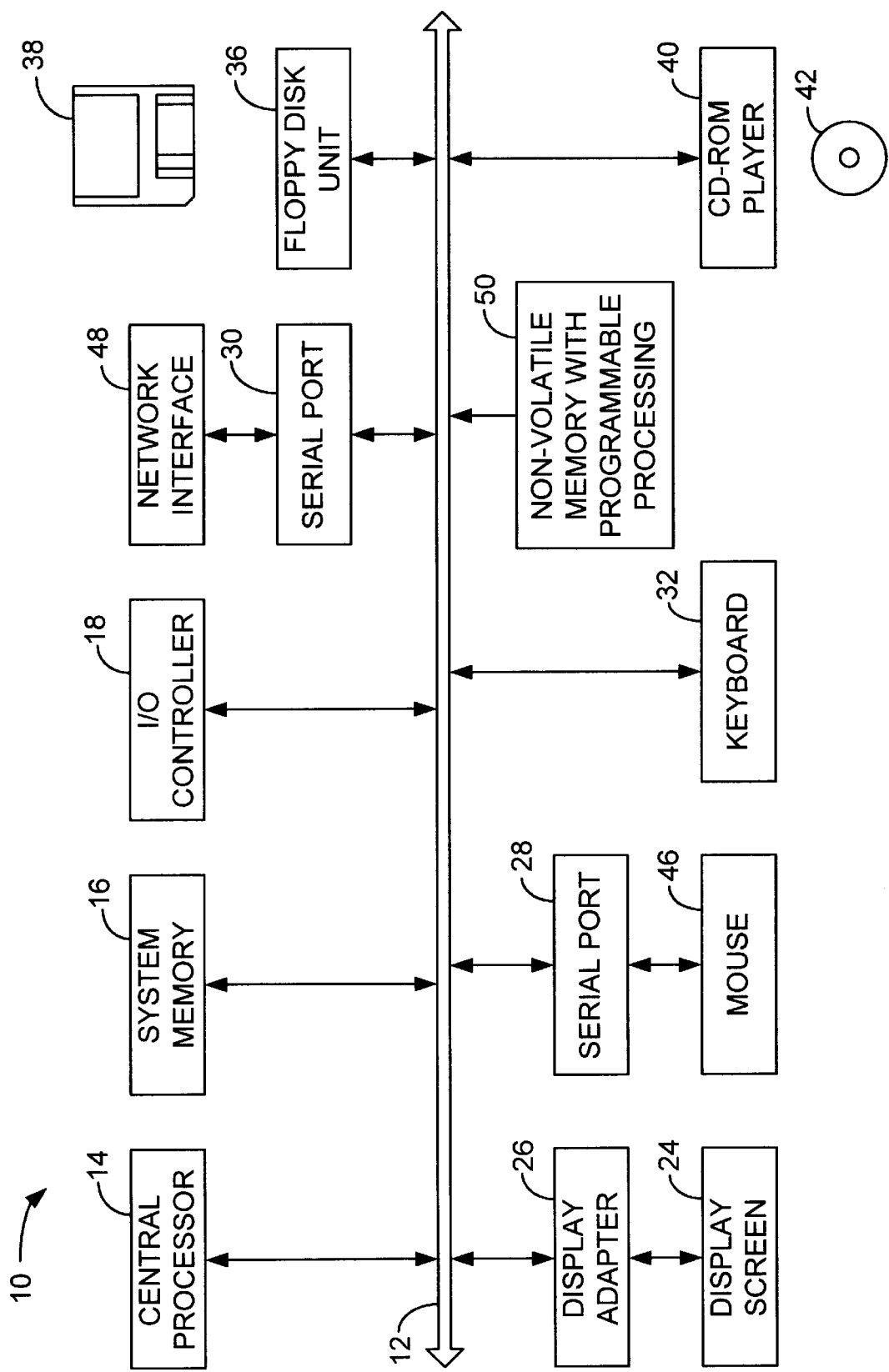
FIG. 1 depicts a computer system suitable for incorporating the present invention.

FIG. 1 depicts a host computer system 10 suitable for incorporating the present invention. Host computer system 10 includes a bus 12 which interconnects major subsystems such as a central processor 14, a system memory 16 (typically RAM), an input/output (I/O) controller 18, an external device such as a display screen 24 via a display adapter 26, serial ports 28 and 30, a keyboard 32, a floppy disk drive 36 operative to receive a floppy disk 38, and a CD-ROM player 40 operative to receive a CD-ROM 42. Many other devices can be connected such as a mouse 46 connected via serial port 28 and a network interface 48 connected via serial port 30. Bus 12 may include signal components which may or may not operate together. Bus 12 may be divided into constituent buses for particular purposes such as memory access, I/O access, etc.

In accordance with one embodiment of the present invention, host computer system 10 incorporates a special storage system 50 that incorporates both non-volatile memory and programmable processing for performing operation on the contents of its memory. One function of storage system 50 is to take the place of a combination of a disk controller, such as an IDE controller or SCSI controller, and a hard disk drive. To host computer system 10, storage system 50 appears as a hierarchical memory system able to receive and respond to hierarchical memory control commands to store and retrieve files within a stored directory structure. In accordance with the present invention, storage system 50 is programmable to respond to other commands to perform data processing operations on stored information.

Figure 2A:
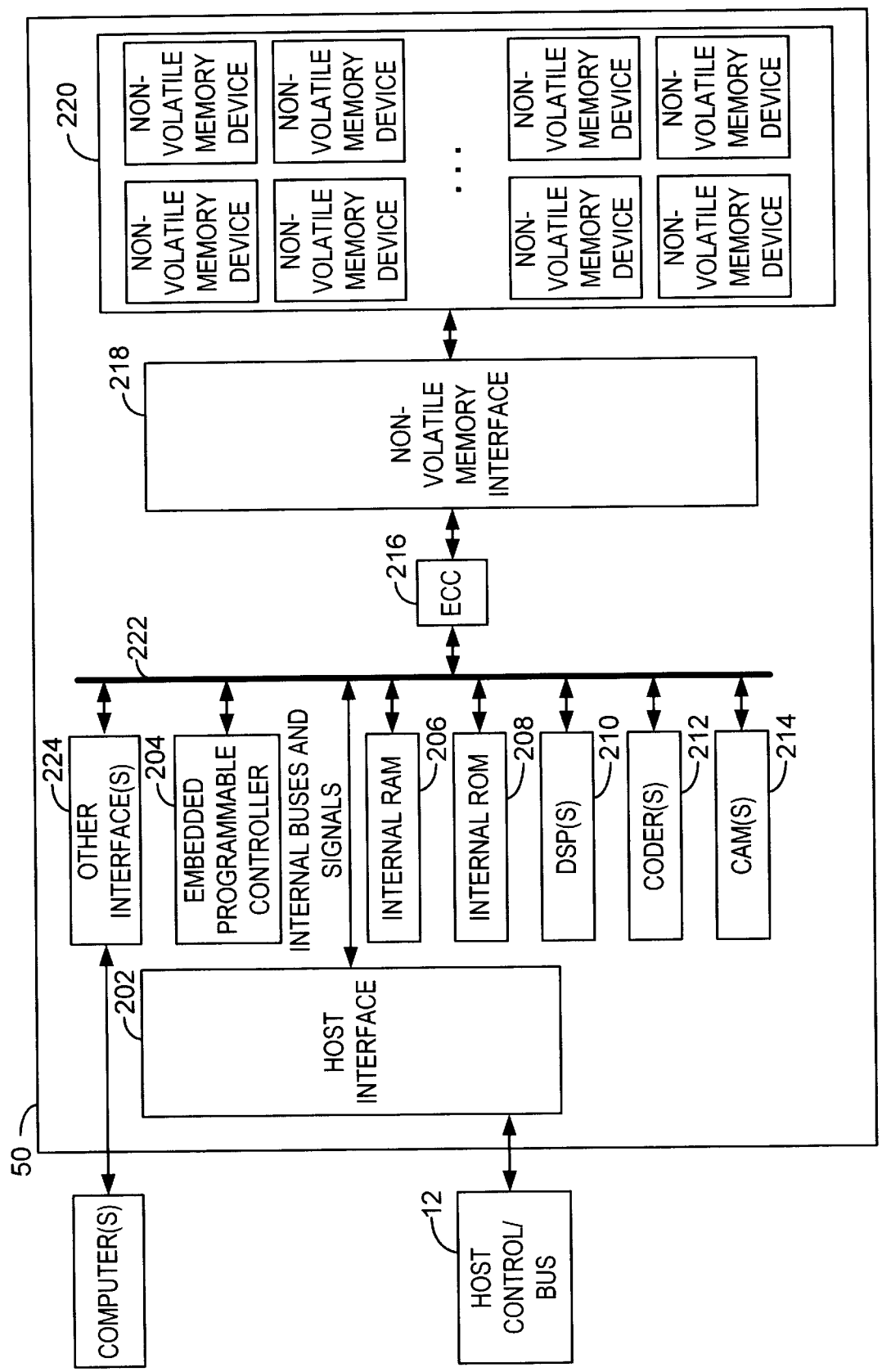
FIG. 2A depicts a storage system combining hierarchical storage and supplemental processing for installation within the computer system of FIG. 1 in accordance with one embodiment of the present invention.

FIG. 2A depicts a particular configuration of storage system 50 in accordance with one embodiment of the present invention. Storage system 50 includes a host interface 202, an embedded programmable controller 204, an internal RAM 206, an internal ROM 208, one or more internal DSP circuits 210, one or more internal coder circuits 212, and one or more content addressable memory (CAM) units 214. Storage system 50 further includes an error correction coding unit 216, a non-volatile memory interface 218, and a plurality of non-volatile memory devices 220. Host interface 202 is connected to embedded programmable controller 204, internal RAM 206, internal ROM 208, DSP circuit 210, coder circuit 212, CAM 214 by an internal bus structure 222. Of course, many of these components may be omitted in accordance with the present invention.

Storage system 50 may be physically implemented as a printed circuit board, a multi-chip module, or a single integrated circuit. The individual circuits of FIG. 2 may be independent integrated circuits. With a greater level of integration, multiple components may be combined into a single integrated circuit.

Host interface 202 interacts with bus 12 of computer system 10. For example, bus 12 may be a PCI bus. Host interface 202 will then be equipped to interact with the PCI bus. In part, host system 10 interacts with storage system 50 as if it were a hierarchical memory structure operating under the direction of an SCSI or IDE controller. Host system 10 uses storage system 50 to save and retrieve files. The interaction between host system 10 and host interface 202 for the purpose of data storage and retrieval is explained in Messmer, *The Indispensable PC Hardware Book*, (Addison Wesley, 2nd Ed. 1995), pp. 731–838, the contents of which are herein incorporated by reference for all purposes.

Embedded programmable controller 204 interprets the storage and retrieval commands received from host system 10 and directs the flow of stored and retrieved data between host interface 202 an non-volatile memory interface 218. Embedded programmable controller 204 is preferably an ARM-7 TDMI available from ARM Limited of Cambridge, England. Error correction coding unit 216 is interposed in the data path between host interface 202 and non-volatile memory interface 218. Error correction coding unit 216 applies an error correcting code to data be stored on non-volatile memory devices 220. For retrieved data, error correction coding unit 216 checks for errors, corrects errors, and removes the code. Error correction coding unit 216 may be programmable via host interface 202.

Non-volatile memory devices 220 are preferably 4MB or larger flash memory devices internally optimized to support MS-DOS sectors. In an alternative embodiment, a hard disk drive, or writable optical drive serves as non-volatile memory. Non-volatile memory interface 218 is particularized to generate whatever data, address, and control signals are needed to interact with non-volatile memory devices 220.

Embedded programmable controller 204 operates in accordance with a control program. A portion of this control program resides in ROM 208 and cannot be easily modified. Another portion is modifiable by host system 10 and resides within non-volatile memory devices 220 and within internal memory of controller 204. The portion within ROM 208 handles basic controller operation and file storage and retrieval. File storage and retrieval is preferably handled as specified by the ATA disk control specification, ANSI-X3-221-1994, as available from the American National Standards Institute of New York, N.Y., the contents of which are herein reproduced in Appendix 1. A description of one example of a ATA interface command set will be given in a later portion of this specification.

Preferably, a minimal set of extensions to the ATA interface command set includes a "write to internal memory of embedded controller," "execute embedded controller memory," "reset embedded controller write memory pointer." When host system 10 is to configure embedded controller 204, it first invokes the command, "reset embedded controller write memory pointer." It then invokes "write to internal memory of embedded controller," as many times as necessary to load the controller's internal memory with the control program. After the program is loaded, the host system may invoke the control program by issuing an "execute embedded controller memory" command. The internal memory of the controller may be either volatile or non-volatile. An example of commands that maybe included in the control program are instructions which are executed on an embedded program controller, for example the ARM-7 TDMI, and are herein reproduced in Appendix 2. A description of one example of a ARM command set will be given in a later portion of this specification.

Further extensions to the ATA interface command set may include but are not limited to "open new internal file," "write internal sector," "read internal sector," "close internal file," "execute internal file," "terminate internal execution," and "hide internal file." The referenced files file sectors are stored in non-volatile memory system 220. The modifiable portion of the control program performs operations on information stored within non-volatile memory devices 220.

By modifying this control program, host computer system 10 may configure storage system 50 to perform various functions independently of CPU 14. For example, storage system 50 may perform JPEG or MPEG image compression on image data to be written within non-volatile memory devices 220. Storage system 50 may also implement image enhancement algorithms to improve resolution to, e.g., correct CCD array flaws or suppress noise in captured NTSC frames. RAM 206 may be used for storage of intermediate results.

In accordance with one embodiment of the present invention, other circuitry may cooperate with embedded programmable controller 204. For example, if included, digital signal processing circuit(s) 210 may assist in digital signal processing operations. Such operations may include calculation of 1-D and 2-D linear transformations such as Discrete Cosine Transforms and Inverse Discrete Cosine Transforms (IDCT) as used in JPEG and MPEG. Other 1-D and 2-D filters may programmed to support other compression schemes such as wavelet-based compression. Digital signal processing circuit(s) 210 may also perform quantization operations to coarsen the data from the 1-D and 2-D filters. Digital signal processing circuit(s) 210 may be one or more components such as the Motorola 56000 series available from Motorola of Schaumburg, Ill., or the Oak DSP core developed by DSP Group, Inc. of Santa Clara, Calif. The control program for digital signal processing circuit(s) 210 is also modifiable by host computer system 10 and stored in non-volatile memory devices 220.

If coder(s) 212 are included, they may assist in other operations needed for image compression and decompression. For example, coder(s) 212 may perform run-length encoding of the results of the outputs of the 2-D DCT or 2-D filters implemented by digital signal processing circuit(s) 210. Coder(s) 212 may also perform bit packing operations to support compression or run-length decoding and unpacking to support decompression. Coder(s) 212 may also perform Huffman encoding and decoding to support the JPEG and MPEG schemes. Coder(s) 212 may also perform bit scrambling to support decryption and/or encryption.

Wavelet and fractal compression/decompression may be supported by DSP circuit(s) 210, coder (s) 212, and CAM(s) 214. Fractal image compression and decompression uses CAM(s) 214 to search for recurring patterns. Further details of fractal image compression and decompression are explained in D. R. McGregor, et al., "Faster Fractal Compression", *Dr. Dobb's Journal*, (January 1996), Y. Fisher, "Fractal Image Compression", *SIGGRAPH '92 Course Notes*, Y. Fischer, et al., "Fractal (Self-VQ) Encoding of Video Sequences", *Proceedings of the SPIE, Visual Communications and Image Processing*, (September 1994), Barnsley, et al., *Fractal Image Compression*, (A.K. Peters Ltd. 1993), and U.S. Pat. No. 5,065,447 issued to Barnsley et al. on Nov. 12, 1991. The contents of all five references are herein incorporated by reference.

Storage system 50 may also enhance the security of encryption and decryption. Password data to control access by host computer system 10 or for encrypting and decrypting data on storage system 50 may be maintained in non-volatile memory system 220. The password data may include one-way key data for decrypting passwords entered by a user. Embedded programmable controller 204 operates to preclude external retrieval to the one-way key data, enhancing security. When the user initially selects the password using application software running on host computer system 10, embedded programmable controller 204 translates the password into the key data that will be used to decrypt the password and stores it in a private memory area of non-volatile memory system 220. This private area is accessible only by embedded programmable controller 204 for password decryption and is not accessible via the ATA hierarchical memory control commands. Such a password may be used to allow access by certain applications on host computer system 10, to control access to otherwise hidden files on non-volatile memory system 220, or to access a key to decrypt or encrypt data stored on non-volatile memory system 220. Encryption and decryption may be supported by coder(s) 212.

To accommodate highly processing-intensive tasks, multiple storage systems as in FIG. 2 may be combined in an array for high speed processing. Such an arrangement is highly suitable for MPEG, wavelet, and fractal compression or decompression. To accommodate this configuration, storage system 50 may include one or more other interfaces 224 for this purpose. Information to be stored or retrieved and control program information may be passed through one of N, preferably 4 or more ports: COM1, COM2, COM3, COM4, etc. Host interface 202 may also be used for interfacing with other storage systems instead of with host bus 12.

Figure 2B:
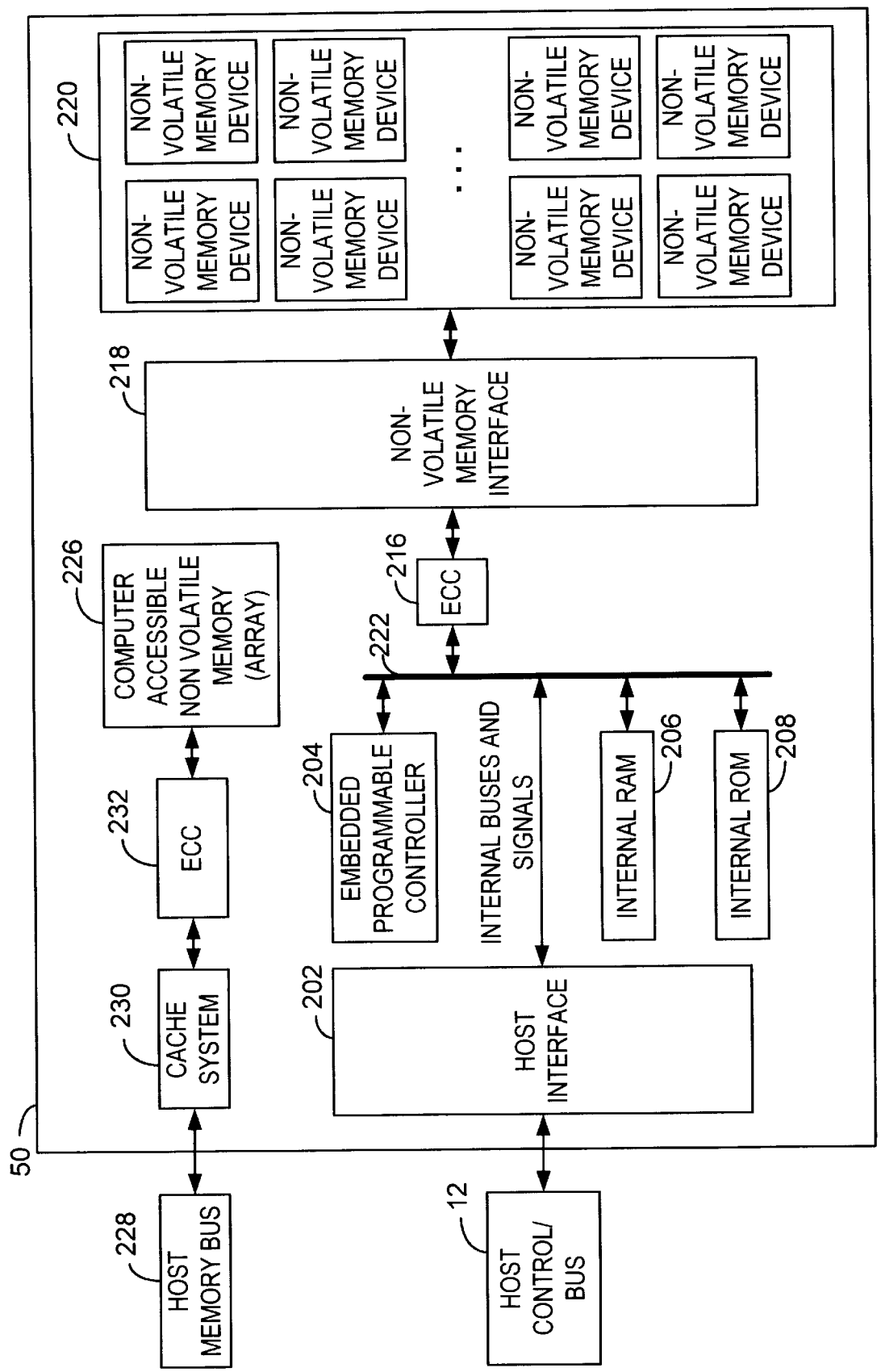
FIG. 2B depicts the storage system of FIG. 2A augmented with computer accessible memory which may be accessed as a part of system memory of the host system of FIG. 1 in accordance with one embodiment of the present invention.

FIG. 2B depicts an extension to storage system 50 wherein a computer accessible memory 226 is physically integrated with storage system 50. Although only a portion of the components depicted in FIG. 2A are replicated in FIG. 2B, it is to be understood that any of the components of FIG. 2A may be included with a storage system 50 that is physically integrated with computer accessible memory 226. Computer accessible memory 226 connects to a host system memory bus 228 which may form a portion of bus 12. Computer accessible memory 226 operates within system memory 16 and may include one or both of volatile and non-volatile memory circuitry. Host bus 12 may include signals which are independent and concurrently active relative to the computer memory access signals whereby data processing elements in storage system 50 may independently and concurrently operate upon or transmit to these signals to support data compression (including image compression), decompression, encryption, decryption or other high speed data processing requirements.

Furthermore, a cache 230 and a further error correction coding unit 232 are interposed between computer accessible memory 226 and host system memory bus 228. Cache 230 optimizes system memory access performance for host system 10 and is particularly valuable in non-volatile memory applications. Error correction coding unit 232 improves the reliability and life expectancy (known as mean time between failure) of computer accessible memory 226.

Figure 3:
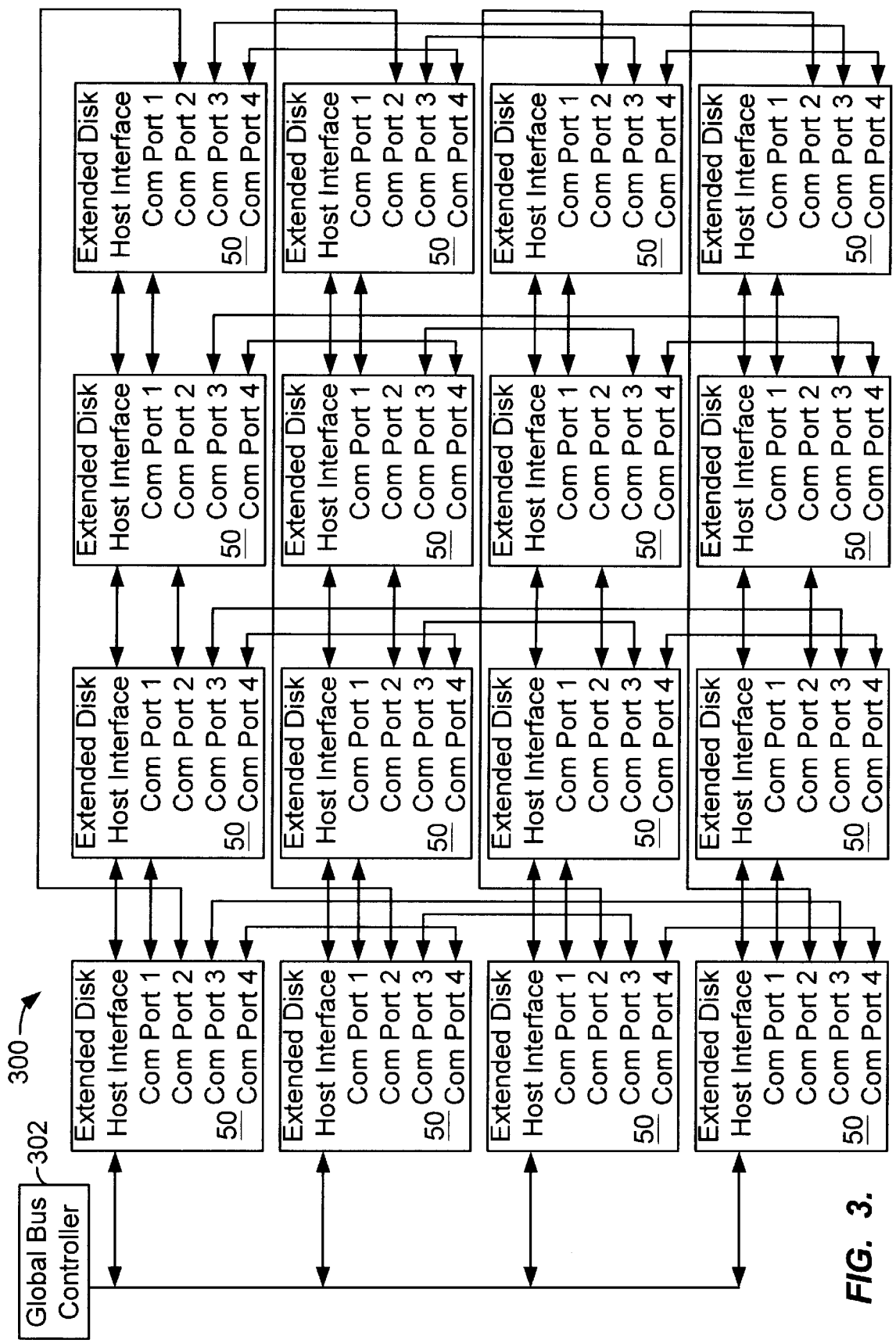
FIG. 3 depicts a network of storage systems similar to the one in FIG. 2 in accordance with one embodiment of the present invention.

FIG. 3 depicts such an array configuration 300 including multiple storage systems 50 and a global bus controller 302. Global bus controller 302, known to those of skill in the art, serves as the direct interface to host bus 12. Global bus controller 302 directs information to be stored, control program information, storage and retrieval commands, and processing commands to a particular storage system 50. Global bus controller 302 receives retrieved information from storage systems 50 and sends it onto host bus 12. For storage and retrieval purposes, the host system interacts with global bus controller 302 with conventional storage and retrieval commands as would be used by a SCSI or IDE hard disk controller. These commands are augmented with additional commands for requesting special processing operations.

To distribute commands, control program information, and information to be stored and retrieved, a 2-D binary tree communication network interconnects multiple storage systems 50. FIG. 3 shows a particular configuration with 16 storage systems 50. The various COM ports and host interface are used to interconnect the storage systems 50. A part of the control program for each storage system 50 concerns providing the necessary connectivity within the context of the overall network. In many image compression schemes, each storage system 50 performs the processing associated with a strip of an image or a group of strips. The network also incorporates a 2-dimensional nearest-neighbor-with-edge-units-wrapping-around-to-corresponding-edge-units communications scheme often known as a torus communications grid.

Figure 4:
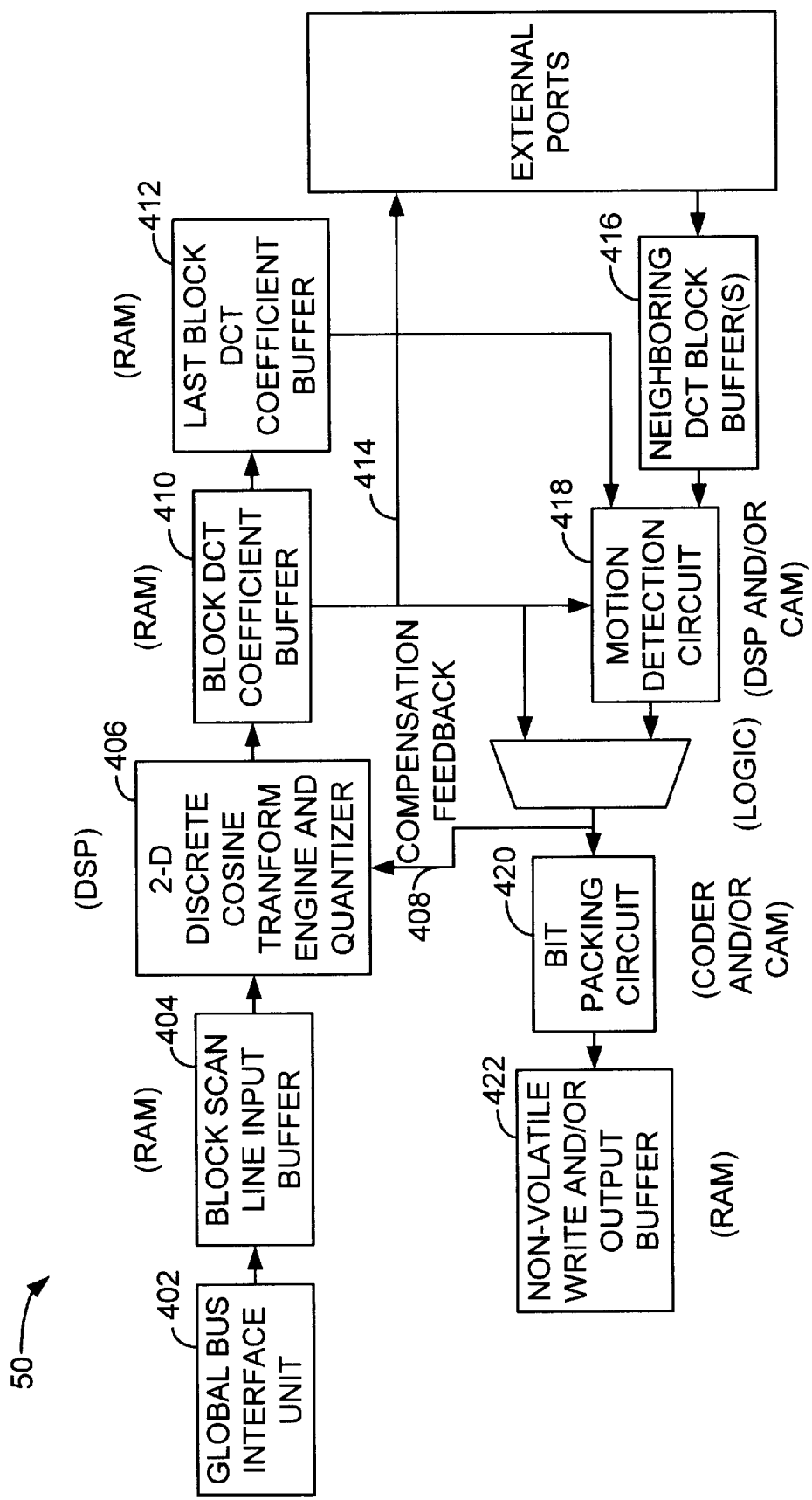
FIG. 4 depicts how subunits of storage systems similar to the one in FIG. 2 are functionally interconnected in an MPEG compression application of the multiple storage system configuration of FIG. 3 in accordance with one embodiment of the present invention.

FIG. 4 depicts how subunits of storage system 50 are functionally interconnected in an MPEG compression application of the multiple storage system configuration of FIG. 3. The various subunits perform the functions necessary to MPEG compression. A global bus interface unit 402 receives input pixel data from global bus controller 302 either directly or via one or more other storage systems 50. A scan line block input input buffer 404 is implemented with RAM 206. A 2-D Discrete Cosine Transform Engine and Quantizer 406 transforms the pixel data and quantizes the results in accordance with quantization control information delivered via a compensation feedback input 408 and other quantization control information received from global bus controller 302. The result is quantized block DCT coefficient data which is stored in a block DCT coefficient buffer 410, also implemented by RAM 206.

The MPEG compression schemes take advantage of similarities between successive frames of pixels and the fact that differences between successive frames often consist of motion of one or more objects against a fixed background. Accordingly, it is useful to store a last block of DCT coefficients in a last block DCT coefficient buffer 412, also implemented by RAM 206. Furthermore, because motion may involve importing an object from an adjacent pixel area handled by a different storage system, an input line 414 connects to one or more of the COM ports or host interface 202. Similarly, a neighborhood DCT block buffer 416 also implemented by RAM 206 receives DCT coefficients from one or more other storage systems 50. A motion detection circuit 418 can then generate motion data based on the difference between the current DCT coefficients and previous ones. Motion detection circuit 418 may be implemented by DSP circuit(s) 210 and/or CAM unit(s) 214. Motion detection circuit 418 generates data for special difference frames for characterizing a difference from a previous frame.

A logic circuit 419 switches between the DCT coefficient data of the current frame and the difference data and also generates data for controlling the final grouping of MPEG data into I-frames, B-frames, and P-frames as known to those of skill in the art. Logic circuit 419 also generates a portion of the quantization control data for compensation feedback input 408. A bit packing circuit 420 composes the frames, and writes them to a non-volatile write and/or output buffer implemented by RAM 206. From there, the packet data are written to non-volatile memory system 220.

Storage system 50 implements a non-volatile memory circuit with user configurable encryption capabilities. For example, storage system 50 may store a phone number directory in encrypted form which may be decrypted only upon entering a password. The key for verifying the password is stored in non-volatile memory system 220 and may not be retrieved or altered. Instead of a password, a voice sample or thumb print may be analyzed to provide access. Again the key for verifying the voice sample or thumb print is not accessible outside of storage system 50. The processing for verification, encryption, and/or decryption may be performed by the various processing components within storage system 50, especially coder(s) 212.

Figure 5:
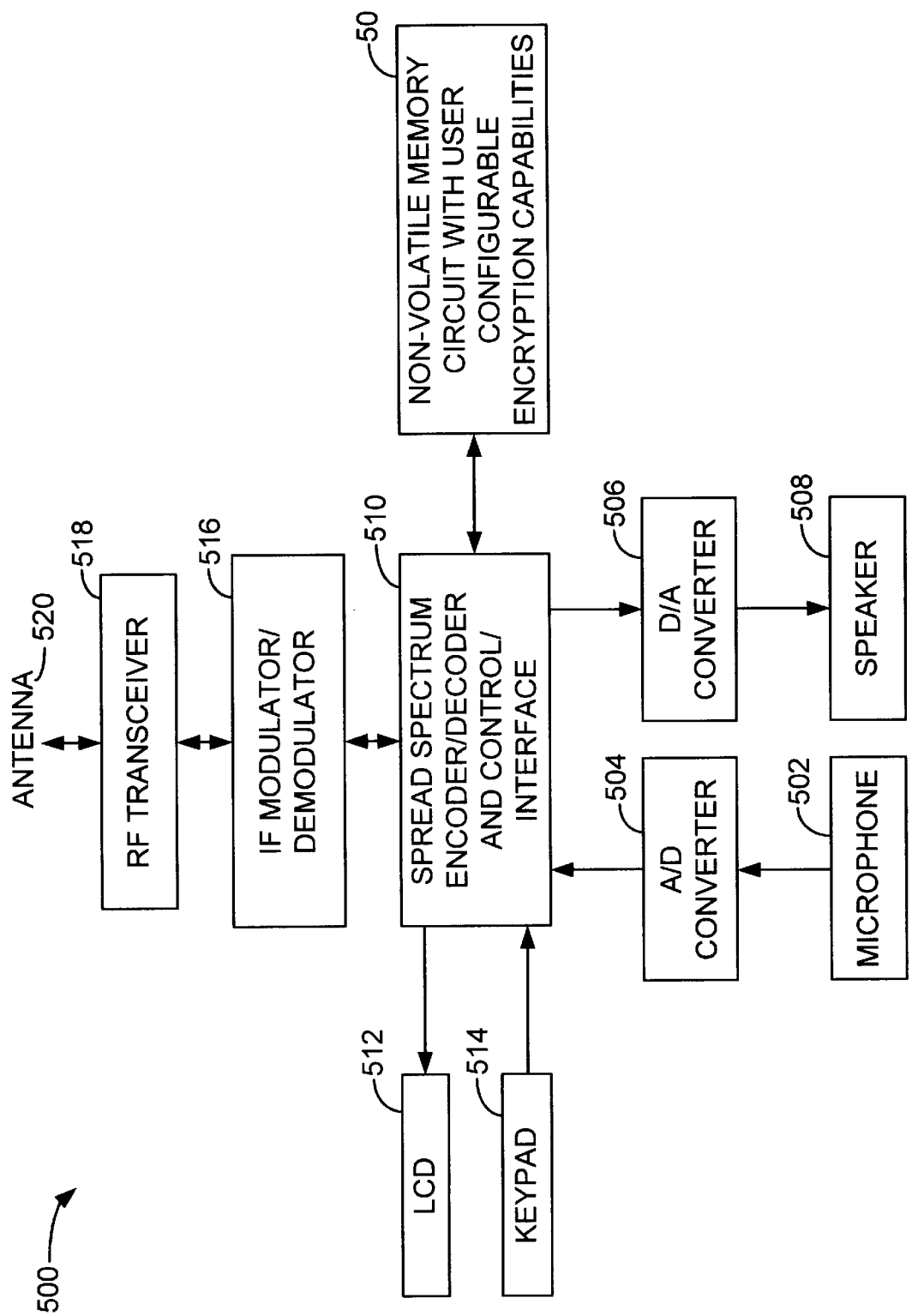
FIG. 5 depicts functional elements of a digital portable telephone which acts as a host computer system to the storage system of FIG. 2 in accordance with one embodiment of the present invention.

A host computer system as depicted in FIG. 1 is but one application of storage system 50. Other devices may also take advantages of the features of storage system 50. FIG. 5 depicts functional elements of a digital portable telephone 500 which acts as a kind of host computer system. A microphone 502 converts the user's speech to an input analog audio signal. An A/D converter 504 converts this input analog audio signal to an input digital audio signal. Similarly, a D/A converter 506 converts an output digital audio signal to an output analog audio signal to be fed to a speaker 508. A spread spectrum encoder/decoder and control/interface 510 performs the control functions for the telephone, controlling interaction with a public wireless telephone network, decoding received spread spectrum signals and generating encoded spread spectrum signals. An LCD display 512 displays user interface information. A keypad 514 allows the user to control the operation of telephone 500.

An IF modulator/demodulator 516 performs the modulation and demodulation functions at an intermediate frequency (IF). An RF transceiver 518 converts the IF signal to an allocated frequency for transmission by an antenna 520 to the public wireless network. Furthermore, RF transceiver 518 receives a signal from antenna 520 and converts it to IF for demodulation by IF modulator/demodulator 516.

Further inaccessible encryption and decryption keys stored in non-volatile memory system 220 may be used for encrypting and decrypting voice signals to enhance the security of wireless communications. Invoking secure voice transmission also typically requires entry of a password or analysis of a thumbprint or voice sample. Encryption and decryption of the voice signal is performed by the various processing components within storage system 50. For added security, storage system 50 may be detachable from portable telephone 500.

Figure 6:
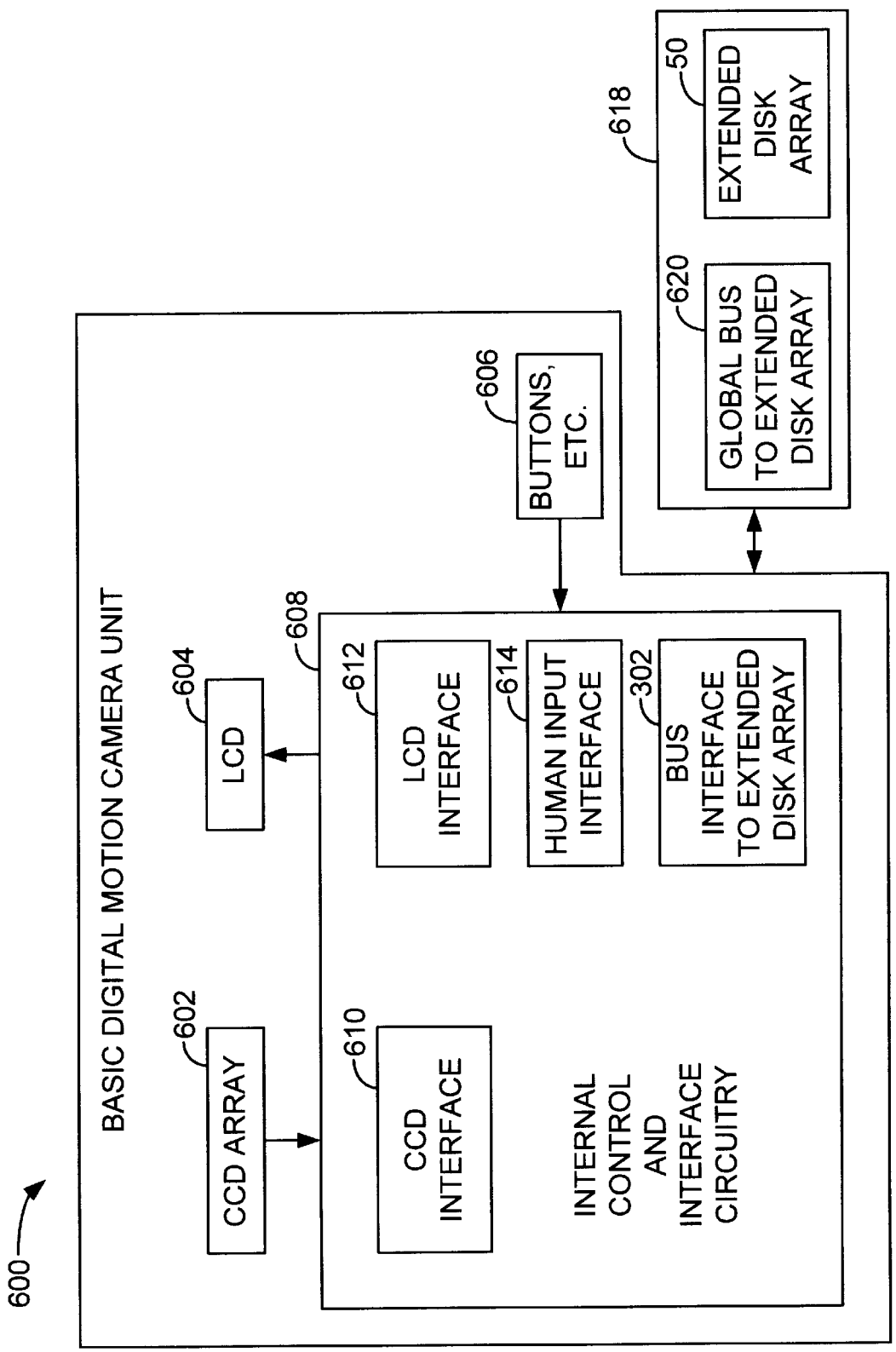
FIG. 6 depicts a digital motion camera unit that acts as a host computer system to the storage system of FIG. 2 in accordance with one embodiment of the present invention.

FIG. 6 depicts a digital motion camera unit 600 that acts as a host computer system to storage system 50. Digital motion camera unit 600 includes a CCD array 602 for detecting an image and converting the image to an electrical signal. An LCD display 604 displays a user interface. A user controls digital motion camera unit 600 via a keypad 606. Internal control and interface circuitry 608 incorporates a CCD interface 610, an LCD interface 612, a human input interface 614, and global bus controller 302. In accordance with one embodiment of the present invention, a removable card incorporates 618 the array of storage systems 50 shown in FIG. 3 and an interface 620 to connect to global bus controller 302. Removable card 618 stores moving image data captured by CCD array 602 and performs MPEG compression, as discussed with reference to FIG. 4, on the moving image data to increase storage capacity. Removable card 618 may plug into a player (not shown) to replay the captured moving image data. At that time, the processing components of removable card 618 may perform MPEG decompression.

Figure 7:
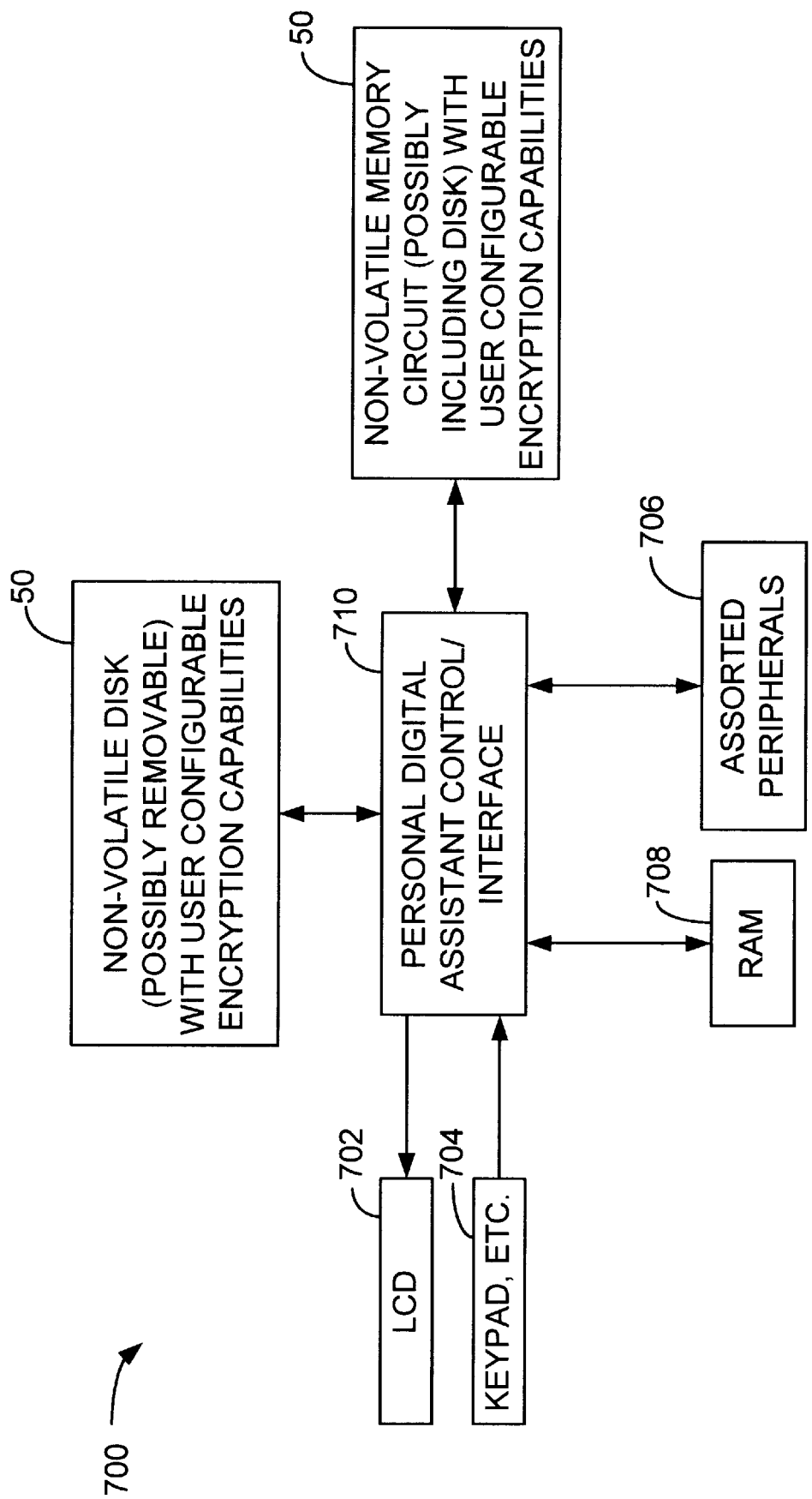
FIG. 7 depicts a personal digital assistant that acts as a host computer system to the storage system of FIG. 2 in accordance with one embodiment of the present invention.

FIG. 7 depicts a personal digital assistant 700 that acts as a host computer system to one or more storage systems 50. An LCD screen 702 displays a user interface. A user may enter data or control the operation of personal digital assistant 700 by using a keypad 704 or other assorted peripherals 706 such as a stylus. Intermediate results and control information are stored in a RAM 708. A personal digital assistant control/interface 710 serves as the principle processor of personal digital assistant 700. For long term storage of data and software, personal digital assistant 700 uses one or more storage systems 50. FIG. 7 shows one of the storage systems 50 as being removable. For user security, one or more of storage systems 50 may store encrypted data accessible via a user password. As was discussed above, the key for verifying the password is not accessible outside storage system 50. Without the password, even the presence of encrypted files may not be visible.

In the foregoing specification, the invention has been described with reference to specific exemplary embodiments thereof. It will, however, be evident that various modifications and changes may be made thereunto without departing from the broader spirit and scope of the invention as set forth in the appended claims. Many such changes or modifications will be readily apparent to one of ordinary skill in the art. The specification and drawings are, accordingly, to be regarded in an illustrative rather than a restrictive sense, the invention being limited only by the provided claims and their full scope of equivalents.

An Example ATA Interface Command Set

The application environment for the AT Attachment Interface is any computer which uses an AT Bus or ATA interface.

The PC AT™ Bus is a widely used and implemented interface for which a variety of peripherals have been manufactured. As a means of reducing size and cost, a class of products has emerged which embed the controller functionality in the drive. These new products utilize the AT bus fixed disk interface protocol, and a subset of the AT bus. Because of their compatibility with existing AT hardware and software this interface quickly became a de facto industry standard.

Software in the Operating System in the host computer system dispatches I/O (Input/Output) requests via the AT Bus to computer peripherals which respond to direct commands.

Data is transferred in parallel either to or from host memory to the drive's buffer under the direction of commands previously transferred from the host. The drive performs all of the operations necessary to properly write data to, or read data from, the disk media. Data read from the media is stored in the drive's buffer pending transfer to the host memory and data is transferred from the host memory to the drive's buffer to be written to the media.

The Command register on the host includes the command code being sent to the drive. Command execution begins immediately after this register is written. The executable commands, the command codes, and the necessary parameters for each command are listed in table 1.

TABLE 1

Command Codes and Parameters

| Class | Command | Code | FR | SC | SN | CY | DH |
|---|---|---|---|---|---|---|---|
| 1 | Acknowledge media chng | O | DBh | | | | | D |
| 1 | Boot — post-boot | O | DCh | | | | | D |
| 1 | Boot — pre-boot | O | DDh | | | | | D |
| 1 | Check power mode | O | 98h E5h | | Y | | | D |
| 1 | Door lock | O | DEh | | | | | D |
| 1 | Door unlock | O | DFh | | | | | D |
| 1 | Execute drive diagnostic | M | 90h | | | | | D* |
| 2 | Format track | M | 50h | * | Y | | Y | Y |
| 1 | Identify drive | O | ECh | | | | | D |
| 1 | Idle | O | 97h E3h | | Y | | | D |
| 1 | Idle immediate | O | 95h E1h | | | | | D |
| 1 | Initialize drive parameters | M | 91h | | Y | | | Y |
| 1 | NOP | O | 00h | | | | | Y |
| 1 | Read buffer | O | E4h | | | | | D |
| 1 | Read DMA (w/retry) | O | C8h | | Y | Y | Y | Y |
| 1 | Read DMA (w/o retry) | O | C9h | | Y | Y | Y | Y |
| 1 | Read long (w/retry) | M | 22 | | Y | Y | Y | Y |
| 1 | Read long (w/o retry) | M | 23 | | Y | Y | Y | Y |
| 1 | Read multiple | O | C4h | | Y | Y | Y | Y |
| 1 | Read sector(s) (w/retry) | M | 20 | | Y | Y | Y | Y |
| 1 | Read sector(s) (w/o retry) | M | 21 | | Y | Y | Y | Y |
| 1 | Read verify sector(s) (w/retry) | M | 40 | | Y | Y | Y | Y |
| 1 | Read verify sector(s) (w/o retry) | M | 41 | | Y | Y | Y | Y |
| 1 | Recalibrate | M | 1xh | | | | | Y |
| 1 | Seek | M | 7xh | | | | Y | Y |
| 1 | Set features | O | EFh | Y | | | | D |
| 1 | Set multiple mode | O | C6h | | Y | | | D |
| 1 | Sleep | O | 99h E6h | | | | | D |
| 1 | Standby | O | 96h E2h | | Y | | | D |
| 1 | Standby immediate | O | 94h E0h | | | | | D |
| 2 | Write buffer | O | E8h | | | | | D |
| 3 | Write DMA (w/retry) | O | CAh | | Y | Y | Y | Y |
| 3 | Write DMA (w/o retry) | O | CBh | | Y | Y | Y | Y |
| 3 | Write long (w/retry) | M | 32 | * | Y | Y | Y | Y |
| 3 | Write long (w/o retry) | M | 33 | * | Y | Y | Y | Y |
| 3 | Write multiple | O | C5h | * | Y | Y | Y | Y |
| 3 | Write same | O | E9h | Y | Y | Y | Y | Y |
| 2 | Write sector(s) (w/retry) | M | 30 | * | Y | Y | Y | Y |
| 2 | Write section(s) (w/o retry) | M | 31 | * | Y | Y | Y | Y |
| 3 | Write verify | O | 3Ch | * | Y | Y | Y | Y |
| | Vendor unique | V | 9Ah | | | | | |
| | Vendor unique | V | C0-C3h | | | | | |
| | Vendor unique | V | 8xh | | | | | |
| | Vendor unique | V | F0h-FFh | | | | | |
| | Reserved: all remaining codes | | | | | | | |

M = mandatory
O = optional
CY = Cylinder registers
DH = Drive/head register
FR = Features register
SC = Sector count register
SN = Sector number register
Y — The register contains a valid parameter for this command. For the drive/head register, Y means both the drive and head parameters are used.
D — Only the drive parameter is valid and not the head parameter.
D* — Addressed to drive O but both drives execute it.
* — Maintained for compatibility.

Command Descriptions

Commands are issued to the drive by loading the pertinent registers in the command block with the needed parameters, and then writing the command code to the Command Register.

1.1 Acknowledge Media Change (removable)

If the drive is operating in a mode which requires that the operating system acknowledge a media change, this command clears the Media Change Error so that normal operation can resume. If the drive is not operating in such a mode, this command returns an Abort error.

1.2 Boot—Post-boot (removable)

This command provides a means to send vendor-specific information that may be required in order to pass diagnostics which are applicable to non-removable disk drives.

1.3 Boot—Pre-boot (removable)

This command is issued to prepare a removable drive to respond to boot.

1.4 Check Power Mode

This command checks the power mode.

If the drive is in the Idle Mode, the drive shall set BSY, set the Sector Count Register to FFh, clear BSY, and generate an interrupt.

1.5 Door Lock (removable)

This command locks the door if the drive is Ready and unlocked, otherwise it responds with Not Ready.

1.6 Door Unlock (removable)

This command unlocks the door if the drive is Ready and locked, otherwise it responds with Not Ready.

1.7 Execute drive diagnostic

This command shall perform the internal diagnostic tests implemented by the drive.

1.8 Format Track

The implementation of the Format Track command is vendor specific. The actions may be a physical reformatting of a track, initializing the data field contents to some value, or doing nothing.

1.9 Identify Drive

The Identify Drive command enables the host to receive parameter information from the drive. When the command is issued, the drive sets BSY, stores the required parameter information in the sector buffer, sets DRQ, and generates an interrupt. The host then reads the information out of the sector buffer. Note: BSY (Busy) is set whenever the drive has access to the Command block Registers. The host should not access the Command Block Register when BSY=1.

1.10 Idle

This command causes the drive to set BSY, enter the Idle Mode, clear BSY, and generate an interrupt. The interrupt is generated even thought he drive may not have fully transitioned to Idle Mode. If the drive is already spinning, the spinup sequence is not executed. If the Sector Count Register is non-zero then the automatic power down sequence shall be enabled and the timer begins counting down immediately. If the Sector Count Register is zero then the automatic power down sequence shall be disabled.

1.11 Idle Immediate

This command causes the drive to set BSY, enter the Idle Mode, clear BSY, and generate an interrupt. The interrupt is generated even though the drive may not have fully transitioned to Idle Mode.

1.12 Initialize Drive Parameters

This command enables the host to set the number of sectors per track and the number of heads minus 1, per cylinder. Upon receipt of the command, the drive sets BSY, saves the parameters, clears BSY, and generates an interrupt.

The only two register values used by this command are the Sector Count Register which specifies the number of sectors per track and the Drive/Head Register which specifies the number of heads minus 1. The DRV bit designates these values to Drive 0 or Drive 1, as appropriate.

The sector count and head values are not checked for validity by this command. If they are invalid, no error will be posted until an illegal access is made by some other command.

1.13 NOP

This command enables a host which can only perform 16-bit register accesses to check drive status. The drive shall respond as it does to an unrecognized command by setting Abort in the Error Register, Error in the Status Register, clearing Busy in the Status Register, and asserting INTRQ.

1.14 Read Buffer

The Read Buffer command enables the host to read the current contents of the drive's sector buffer. When this command is issued, the drive sets BSY, sets up the sector buffer for a read operation, sets DRQ, clears BSY, and generates an interrupt. The host then reads up to 512 bytes of data from the buffer.

The Read Buffer and Write Buffer commands shall be synchronized such that sequential Write Buffer and Read Buffer commands access the same 512 bytes within the buffer.

1.15 Read DMA

This command executes in a similar manner to the Read Sectors command except for the following:

the host initializes a slave-DMA channel prior to issuing the command;

data transfers are qualified by DMARQ and are performed by the slave-DMA channel;

the drive issues only one interrupt per command to indicate that data transfer has terminated and status is available.

Any unrecoverable error encountered during execution of a Read DMA command results in the termination of data transfer at the sector where the error was detected. The sector in error is not transferred. The drive generates an interrupt to indicate that data transfer has terminated and status is available. The error posting is the same as that of the Read Sectors command.

1.16 Read long command performs similarly to the Read Sectors command except that it returns the data and the ECC bytes contained in the data field of the desired sector. During a Read Long command, the drive does not check the ECC bytes to determine if there has been a data error. Only single sector read long operations are supported.

1.17 Read Multiple Command

The read Multiple command performs similarly to the Read Sectors command. Interrupts are not generated on every sector, but on the transfer of a block which contains the number of sectors defined by a Set Multiple command.

Command execution is identical to the Read Sectors operation except that the number of sectors defined by a Set Multiple command are transferred without intervening interrupts. DRQ qualification of the transfer is required only at the start of the data block, not on each sector. The block count of sectors to be transferred without intervening interrupts is programmed by the Set Multiple Mode command, which shall be executed prior to the Read Multiple command. When the Read Multiple command is issued, the Sector Count Register contains the number of sectors (not the number of blocks of the block count) requested. If the number of requested sectors is not evenly divisible by the block count, as many full blocks as possible are transferred, followed by a final, partial block transfer. The partial block transfer shall be for n sectors, where n=Remainder (sector count/block count). If the Read Multiple command is attempted before the Set Multiple Mode command has been executed or when Read Multiple commands are disabled, the Read Multiple operation shall be rejected with an Aborted Command error.

Disk errors encountered during Read Multiple commands are posted at the beginning of the block or partial block transfer, but DRQ is still set and the data transfer shall take place as it normally would, including transfer of corrupted data, if any.

The contents of the Command Block Registers following the transfer of a data block which had a sector in error are undefined. The host should retry the transfer as individual requests to obtain valid error information.

Subsequent blocks or partial blocks are transferred only if the error was a correctable data error. All other errors cause the command to sjtop after transfer of the block which contained the error. Interrupts are generated when DRQ is set at the beginning of each block or partial block.

1.18 Read Sector(s)

This command reads from 1 to 256 sectors as specified in the Sector Count register. A sector count of 0 requests 256 sectors. The transfer begins at the sector specified in the Sector Number Register. See 10.1 for the DRQ, IRQ, and BSY protocol on data transfers.

If the drive is not already on the desired track, an implied seek is performed. Once at the desired track, the drive searches for the appropriate ID field. If retries are disabled and two index pulses have occurred without error free reading of the requested ID, an ID Not Found error is posted. If retries are enabled, up to a vendor specific number of attempts may be made to read the requested ID before posting an error. If the ID is read correctly, the data address mark shall be recognized within a specified number of bytes, or the Address Mark Not Found error is posted.

DRQ is always set prior to data transfer regardless of the presence or absence of an error condition. At command completion, the Command Block Registers contain the cylinder, head, and sector number of the last sector read. If an error occurs, the read terminates at the sector where the error occurred. The Command Block Registers contain the cylinder, head, and sector number of the sector where the error occurred. The flawed data is pending in the sector buffer.

1.19 Read Verify Sector(s)

This command is identical to the Read Sectors command, except that DRQ is never set, and no data is transferred to the host. When the command is accepted, the drive sets BSY.

When the requested sectors have been verified, the drive clears BSY and generates an interrupt. Upon command completion, the Command Block Registers contain the cylinder, head, and sector number of the last sector verified.

If an error occurs, the verify terminates at the sector where the error occurs. The Command Block Registers contain the cylinder, head, and sector number of the sector where the error occurred. The Sector Count Register shall contain the number of sectors not yet verified.

1.20 Recalibrate

This command moves the read/write heads from anywhere on the disk to cylinder 0. Upon receipt of the command, the drive sets BSY and issues a seek to cylinder zero. The drive then waits for the seek to complete before updating status, clearing BSY and generating an interrupt. If the drive cannot reach cylinder 0, a Track Not Found error is posted.

1.21 Seek

This command is used by the host to establish the following parameters which affect the execution of certain drive features as shown in table 2.

TABLE 2

Set feature register definitions

| | |
|---|---|
| 01h | Enable 8-bit data transfers |
| 02h | Enable write cache* |
| 03h | Set transfer mode based on value in sector count register |
| 33h | Disable retry* |
| 44h | Vendor unique length of ECC on read long/write long commands |
| 54h | Set cache segments to sector count register value* |
| 55h | Disable read look-ahead feature |
| 66h | Disable reverting to power on defaults |
| 77h | Disable ECC* |
| 81h | Disable 8-bit data transfers |
| 82h | Disable write cache* |
| 88h | Enable ECC* |
| 99h | Enable retries* |
| AAh | Enable read look-ahead feature |
| ABh | Set maximum prefetch using sector count register value* |
| BBh | 4 bytes of ECC apply on read long/write long commands |
| CCh | Enable reverting to power on defaults |

*These commands are vendor-specified

If the value in the register is not supported or is invalid, the drive posts an Aborted Command error.

At power on, or after a hardware reset, the default mode is the same as that represented by values greater than 80 h which may have been modified since power on to remain at the same setting after a software reset.

A host can choose the transfer mechanism by Set Transfer Mode and specifying a value in the Sector Count Register. The upper 5 bits define the type of transfer and the low order 3 bits encode the mode value.

| | |
|---|---|
| Block transfer (default) | 00000 000 |
| Single word DMA mode x | 00010 0xx |
| Multiword DMA mode 0 | 00100 000 |

See vendor specification for the default mode of the commands which are vendor-specified.

This command enables the drive to perform Read and Write Multiple operations and establishes the block count for these commands.

The Sector Count Register is loaded with the number of sectors per block. Drives shall support block sizes of 2, 4, 8, and 16 sectors, if their buffer size is at least 8,192 bytes, and may also support other block sizes. Upon receipt of the command, the drive sets BSY=1 and checks the Sector Count Register.

If the Sector Count Register contains a valid value and the block count is supported, the value is loaded for all subsequent Read Multiple and Write Multiple commands and execution of those commands is enabled. If a block count is not supported, an Aborted Command error is posted, and Read Multiple and Write Multiple commands are disabled.

If the Sector Count Register contains 0 when the command is issued, Read and Write Multiple commands are disabled.

At power on, or after a hardware reset, the default mode is Read and Write Multiple disabled. If Disable Default has been set in the Features Register then the mode remains the same as that last established prior to a software reset, otherwise it reverts to the default of disabled.

1.24 Sleep

This command is the only way to cause the drive to enter Sleep Mode. The drive is spun down, and when it is stopped, BSY is cleared, an interrupt is generated, and the interface becomes inactive. The only way to recover from Sleep mode is with a software reset or a hardware reset.

1.25 Standby

This command causes the drive to enter the Standby Mode. The drive may return the interrupt before the transition to Standby Mode is completed. If the drive is already spun down, the spin down sequence is not executed. If the Sector Count Register is non-zero then the automatic power down sequence shall be enabled and the timer will begin counting down when the drive returns to Idle mode. If the Sector Count Register is zero then the automatic power down sequence shall be disabled.

1.26 Standby Immediate

This command causes the drive to enter the Standby Mode. See 10.3 for protocol. The drive may return the interrupt before the transition to Standby Mode is completed. If the drive is already spun down, the spin down sequence is not executed.

1.27 Write Buffer

This command enables the host to overwrite the contents of the drive's sector buffer with any data pattern desired. The Read Buffer and Write Buffer commands shall be synchronized within the drive such that sequential Write Buffer and Read Buffer commands access the same 512 bytes within the buffer.

1.28 Write DMA

This command executes in a similar manner to Write Sectors except for the following:

- the host initializes a slave-DMA channel prior to issuing the command;
- data transfers are qualified by DMARQ and are performed by the slave-DMA channel;
- the drive issues only one interrupt per command to indicate that data transfer has terminated and status is available.

Any error encountered during Write DMA execution results in the termination of data transfer. The drive issues an interrupt to indicate that data transfer has terminated and status is available in the Error Register. The error posting is the same as that of the Write Sectors command.

1.29 Write Long

This command is similar to the Write Sectors command except that it writes the data and the ECC bytes directly from the sector buffer; the drive does not generate the ECC bytes itself. Only single sector Write Long operations are supported.

1.30 Write Multiple Command

This command is similar to the Write Sectors command. The drive sets BSY within 400 nsec of accepting the command, and interrupts are not presented on each sector but on the transfer of a block which contains the number of sectors defined by Set Multiple.

Command execution is identical to the Write Sectors operation except that the number of sectors defined by the Set Multiple command are transferred without intervening interrupts. DRQ qualification of the transfer is required only at the start of the data block, not on each sector.

The block count of sectors to be transferred without intervening interrupts is programmed by the Set Multiple Mode command, which shall be executed prior to the Write Multiple command.

When the Write Multiple command is issued, the Sector Count Register contains the number of sectors (not the number of blocks or the block count) requested.

If the number of requested sectors is not evenly divisible by the block count, as many full blocks as possible are transferred, followed by a final, partial block transfer. The partial block transfer is for n sectors, where n=Remainder (Sector count/block count)

If the Write Multiple command is attempted before the Set Multiple Mode command has been executed or when Write Multiple commands are disabled, the Write Multiple operation shall be rejected with an aborted command error.

Disk errors encountered during Write Multiple commands are posted after the attempted disk write of the block or partial block transferred. The Write command ends with the sector in error, even if it was in the middle of a block. Subsequent blocks are not transferred in the event of an error. Interrupts are generated when DRQ is set at the beginning of each block or partial block.

The contents of the Command Block Registers following the transfer of a data block which had a sector in error are undefined. The host should retry the transfer as individual requests to obtain valid error information.

1.31 Write Same

This command executes in a similar manner to Write Sectors except that only one sector of data is transferred. The contents of the sector are written to the medium one or more times.

If the Features Register is 22 h, the drive shall write that part of the medium specified by the sector count, sector number, cylinder and drive/head registers. If the Features Register contains DDh, the drive shall initialize all the user accessible medium. If the register contains a value other than 22 h or DDh, the command shall be rejected with an aborted command error.

The drive issues an interrupt to indicate that the command is complete. Any error encountered during execution results in the termination of the write operation. Status is available in the Error Register if an error occurs. The error posting is the same as that of the Write Sectors command.

1.32 Write Sector(s)

This command writes from 1 to 256 sectors as specified in the Sector Count Register (a sector count of zero requests 256 sectors), beginning at the specified sector.

If the drive is not already on the desired track, an implied seek is performed. Once at the desired track the drive searches for the appropriate ID field.

If retries are disabled and two index pulses have occurred without error free reading of the requested ID, an ID Not Found error is posted. If retries are enabled, up to a vendor specific number of attempts may be made to read the requested ID before posting an error.

If the ID is read correctly, the data loaded in the buffer is written to the data field of the sector, followed by the ECO bytes. Upon command completion, the Command Block Registers contain the cylinder, head, and sector number of the last sector written.

If an error occurs during a write of more than one sector, writing terminates at the sector where the error occurs. The Command Block Registers contain the cylinder, head, and sector number of the sector where the error occurred. The host may then read the command block to determine what error has occurred, and on which sector.

1.33 Write Verify

This command is similar to the Write Sectors command, except that each sector is verified immediately after being written. The verify operation is a read without transfer and a check for data errors. Any errors encountered during the verify operation are posted. Multiple sector Write Verify commands write all the requested sectors and then verify all the requested sectors before generating the final interrupt.

An Example ARM Command Set

FIG. 8 shows an example of ARM instruction set formats. The bits, 31-0, 810, represent the horizontal axis and the instruction formats 812, 814, 816, 818, 820, 822, 824, 826, 828, 830, 832, 834, 836, 838, and 840 are listed on the vertical axis. The example ARM command set is given in Table 3.

TABLE 3

| Mnemonic | Instruction | Action | FIG. 8 |
|---|---|---|---|
| ADC | Add with carry | Rd := Rn + Op2 + Carry | 812 |
| ADD | Add | Rd := Rn + Op2 | 812 |
| AND | AND | Rd := Rn AND Op2 | 812 |
| B | Branch | R15 := address | 832 |
| BIC | Bit Clear | Rd := Rn AND NOT Op2 | 812 |
| BL | Branch with Link | R14 := R15, R15 := address | 832 |
| BX | Branch and Exchange | R15 := Rn, T bit := Rn[0] | 820 |
| CDP | Coprocessor Data Processing | (Coprocessor-specific) | 836 |
| CMN | Compare Negative | CPSR flags := Rn + Op2 | 812 |
| CMP | Compare | CPSR flags := Rn − Op2 | 812 |
| EOR | Exclusive OR | Rd := (Rn AND NOT Op2) OR (op2 AND NOT Rn) | 812 |
| LDC | Load coprocessor from memory | Coprocessor load | 834 |
| LDM | Load multiple registers | Stack manipulation (Pop) | 830 |
| LDR | Load register from memory | Rd := (address) | 822, 824, 826 |
| MCR | Move CPU register to coprocessor register | cRn := rRn {<op>cRn} | 838 |
| MLA | Multiply Accumulate | Rd := (Rm * Rs) + Rn | 814, 816 |
| MOV | Move register or constant | Rd := Op2 | 812 |
| MRC | Move from coprocessor register to CPU register | Rn := cRn {<op>cRm} | 838 |
| MRS | Move PSR status/flags to register | Rn := PSR | 812 |
| MSR | Move register to PSR status/flags | PSR := Rm | 812 |
| MUL | Multiply | Rd := Rm * Rs | 814, 816 |
| MVN | Move negative register | Rd := 0xFFFFFFFF EOR Op2 | 812 |
| ORR | OR | Rd := Rn OR Op2 | 812 |
| RSB | Reverse Subtract | Rd := Op2 − Rn | 812 |
| RSC | Reverse Subtract with Carry | Rd := Op2 − Rn − 1 + Carry | 812 |
| SBC | Subtract with Carry | Rd := Rn − Op2 − 1 + Carry | 812 |
| STC | Store coprocessor register to memory | address := CRn | 834 |
| STM | Store Multiple | Stack manipulation (Push) | 830 |
| STR | Store register to memory | <address> := Rd | 822, 824, 826 |
| SUB | Subtract | Rd := Rn − Op2 | 812 |
| SWI | Software Interrupt | OS call | 840 |
| SWP | Swap register with memory | Rd := [Rn], [Rn] := Rm | 818 |
| TEQ | Test bitwise equality | CPSR flags := Rn EOR Op2 | 812 |
| TST | Test bits | CPSR flags := Rn AND Op2 | 812 |

The ARM instructions are conditionally executed according to the state of the CPSR condition codes and the instruction's condition field. This field (bits 31:28) 850 determines the circumstances under which an instruction is to be executed. If the state of the C, N, Z, and V flags fulfills the conditions encoded by the field, the instruction is executed, otherwise it is ignored.

There are sixteen possible conditions, each represented by a two-character suffix that can be appended to the instruction's mnemonic. For example, a Branch (B in assembly language) becomes BEQ for "Branch if Equal", which means the Branch will only be taken if the flag is set.

In practice, fifteen different conditions may be used: these are listed in Table 4, Condition code summary. The sixteen (1111) is reserved, and is not used.

TABLE 4

| Code | Suffix | Flags | Meaning |
|---|---|---|---|
| 0000 | EQ | Z set | equal |
| 0001 | NE | Z clear | not equal |
| 0010 | CS | C set | unsigned higher or same |
| 0011 | CC | C clear | unsigned lower |
| 0100 | MI | N set | negative |

TABLE 4-continued

| Code | Suffix | Flags | Meaning |
|---|---|---|---|
| 0101 | PL | N clear | positive or zero |
| 0110 | VS | V set | overflow |
| 0111 | VC | V clear | no overflow |
| 1000 | HI | C set and Z clear | unsigned higher |
| 1001 | LS | C clear or Z set | unsigned lower or same |
| 1010 | GE | N equals V | greater or equal |
| 1011 | LT | N not equal to V | less than |
| 1100 | GT | Z clear AND (N equals V) | greater than |
| 1101 | LE | Z set OR (N not equal to V) | less than or equal |
| 1110 | AL | (ignored) | always |

In the absence of a suffix, the condition field of most instructions is set to "Always" (suffix AL). This means the instruction will always be executed regardless of the CPSR condition codes.

What is claimed is:

1. Apparatus for providing non-volatile data storage and additional processing to a host computer system, said apparatus comprising:

a non-volatile memory system including at least one non-volatile memory device, said non-volatile memory system responding to hierarchical memory structure control commands received from said host computer system by storing and retrieving information from said host computer system; and a programmable controller, said programmable controller receiving a first control program from said host computer system, and responding to a first command from said host computer system to invoke said first control program, said first control program operating on said information stored in said non-volatile memory system, wherein said non-volatile memory system and said programmable controller together implement a hierarchical memory structure.

2. The apparatus of claim 1 further comprising a RAM device for storing intermediate results of said first control program.

3. The apparatus of claim 1 wherein said non-volatile memory system stores said first control program.

4. The apparatus of claim 1 further comprising a host interface that couples said non-volatile memory system and said programmable controller to said host computer system.

5. The apparatus of claim 1 further comprising a ROM device for storing a non-modifiable second control program of said programmable controller.

6. The apparatus of claim 1 further comprising an error correction coding system coupled to said non-volatile memory system that applies an error correcting code to information stored in said non-volatile memory system and that removes said error correcting code from information retrieved from said non-volatile memory system, whereby errors are detected and corrected.

7. The apparatus of claim 6 wherein said error correction coding system is programmable from said host computer system.

8. The apparatus of claim 1 further comprising a digital signal processor operating in conjunction with said programmable controller.

9. The apparatus of claim 8 wherein said digital signal processor is programmable from said host computer system.

10. The apparatus of claim 1 further comprising a programmable component independent of said programmable controller and operating in conjunction with said programmable controller.

11. The apparatus of claim 10 wherein said programmable component is optimized for performing bit packing and unpacking to support compression and decompression.

12. The apparatus of claim 10 wherein said programmable component supports encryption and decryption.

13. The apparatus of claim 1 further comprising an additional interface component for exchanging information with a system external to said apparatus.

14. A plurality of apparatus as in claim 13 interconnected for data processing under control of said host computer system.

15. The apparatus of claim 1 further comprising a content addressable memory component accessible to said programmable controller.

16. The apparatus of claim 1 wherein said non-volatile memory system comprises a hard disk drive.

17. The apparatus of claim 1 wherein said non-volatile memory system comprises a non-volatile solid state memory device.

18. The apparatus of claim 1 wherein said non-volatile memory system comprises an optical disk drive.

19. The apparatus of claim 1 wherein said non-volatile memory system comprises a writable CD-ROM.

20. The apparatus of claim 1 wherein said programmable controller performs encryption using a key stored in said non-volatile memory system.

21. The apparatus of claim 1 wherein said programmable controller performs password verification using a key stored in said non-volatile memory system.

22. The apparatus of claim 1 wherein said programmable controller performs decryption using a key stored in said non-volatile memory system.

23. The apparatus of claim 1 wherein certain information stored in said non-volatile memory system is inaccessible to said host computer system.

24. The apparatus of claim 23 wherein said certain information comprises a key for one of password verification, encryption, and decryption.

25. The apparatus of claim 1 wherein said host computer issues a second command to said programmable controller to receive data to be part of said first control program.

26. The apparatus of claim 25 wherein said host computer issues a third command to start reception of data for said first control program.

27. The apparatus of claim 1 further comprising:
a supplemental memory system physically integrated with said programmable controller and non-volatile memory system and accessible as a part of system memory to said host computer system.

28. The apparatus of claim 27 wherein said supplemental memory system comprises non-volatile memory.

29. The apparatus of claim 28 further comprising error control coding circuitry to apply error coding to data stored in said memory system accessible as a part of system memory.

30. The apparatus of claim 28 further comprising:
a cache interposed between said memory system and said host computer system optimizing memory access performance of said host computer system.

31. Apparatus for non-volatile data storage and high-speed data processing in a host computer system, said apparatus comprising:
a plurality of units, each said unit comprising:
a non-volatile memory system including at least one non-volatile memory device, said non-volatile memory system responding to hierarchical memory structure control commands by storing and retrieving information;
a programmable controller, said programmable controller operating an externally configurable control program, and responding to a command from said host computer system to invoke said control program, said control program operating on said information stored in said non-volatile memory system, wherein said programmable controller and said non-volatile memory system together implement a hierarchical memory structure; and
an interface system for exchanging information with others of said plurality of units; and wherein
said plurality of units being programmable by said host computer system to operate concurrently on stored information.

32. The apparatus of claim 31 wherein each said unit further comprises a programmable component independent of said programmable controller and operating in conjunction with said programmable controller.

33. The apparatus of claim 32 wherein said programmable component is optimized for performing bit packing and unpacking to support compression and decompression.

34. The apparatus of claim 32 wherein said programmable component supports encryption.

35. The apparatus of claim 32 wherein said programmable component comprises a digital signal processing circuit.

36. The apparatus of claim 31 wherein each of said plurality of units further comprises a content-addressable memory.

37. A host computer system comprising:
a host CPU;
a host bus; and
apparatus for providing non-volatile data storage and additional processing to said host computer system, said apparatus comprising:
a non-volatile memory system including at least one non-volatile memory device, said non-volatile memory system and responding to hierarchical memory structure control commands received from said host computer system by storing and retrieving information from said host computer system; and
a programmable controller, said programmable controller operating a first control program received from said host computer system via said host bus, and responding to a command from said host CPU to invoke said first control program, said first control program operating on said information stored in said non-volatile memory system, wherein said non-volatile memory system and said programmable controller together implement a hierarchical memory system.

38. The host computer system of claim 37 wherein said host computer system is a personal digital assistant.

39. The host computer system of claim 37 wherein said non-volatile memory system stores a key for at least one of encrypting data, decrypting data, and password verification.

40. The wireless telephone unit of claim 37 wherein said key is inaccessible to said host bus.

41. A wireless telephone unit comprising:
an RF transceiver for transmitting and receiving data via a wireless network;
a microphone for capturing input audio signals;
a speaker for outputting audio responsive to an output audio signal;
wireless telephone control circuitry that receives said input audio signals and provides said output audio signals and provides a modulated output signal to said RF transceiver and receives a modulated input signal from said RF transceiver to implement telephone operation via said microphone and said speaker;
a non-volatile memory system including at least one non-volatile memory device, said non-volatile memory system responding to hierarchical memory structure control commands received from said wireless telephone control circuitry by storing and retrieving information from said wireless telephone control circuitry; and
a programmable controller, said programmable controller operating a first control program received from said wireless telephone control circuitry, and responding to a command from said wireless telephone control circuitry to invoke said first control program, said first control program operating on said information stored in said non-volatile memory system, wherein said non-volatile memory system and said programmable controller together implement a hierarchical memory system.

42. The wireless telephone unit of claim 41 wherein said non-volatile memory system stores a key for at least one of encrypting telephone number data, decrypting telephone number data, encrypting voice data, decrypting voice data, and password verification.

43. The wireless telephone unit of claim 42 wherein said key is inaccessible to said wireless telephone control circuitry.

44. A digital motion camera unit comprising:
a CCD array for capturing moving image data;
a camera control circuit that accepts said moving image data and relays said moving image data to a bus interface;
a storage system coupled to said camera control circuit via said bus interface and comprising a plurality of units, each said unit comprising:
a non-volatile memory system including at least one non-volatile memory device, said non-volatile memory system responding to hierarchical memory structure control commands by storing and retrieving information;
a programmable component, said programmable component operating an externally configurable control program, and responding to a command from said camera control circuit to invoke said control program, said control program operating on said information stored in said non-volatile memory system, wherein said programmable controller and said non-volatile memory system together implement a hierarchical memory structure; and
an interface system for exchanging information with others of said plurality of units; and
said plurality of units operating concurrently on stored information.

45. The digital motion camera unit of claim 44 wherein said storage system is removable.

46. The digital motion camera unit of claim 44 wherein said non-volatile memory stores said moving image data and said programmable component operates to compress said moving image data.

47. The digital motion camera unit of claim 46 wherein said programmable component operates to compress said moving image data in accordance with an MPEG compression scheme.

48. The digital motion camera unit of claim 46 wherein said programmable component comprises a programmable controller.

49. The digital motion camera unit of claim 46 wherein said programmable component comprises a digital signal processing circuit.

* * * * *